United States Patent
Guo et al.

(10) Patent No.: US 11,421,764 B2
(45) Date of Patent: Aug. 23, 2022

(54) CURVED GROOVE BALL BEARING MECHANISM

(71) Applicant: Northwest A&F University, Shaanxi (CN)

(72) Inventors: Kangquan Guo, Shaanxi (CN); Qunzhuo Li, Shaanxi (CN); Fang Gu, Shaanxi (CN)

(73) Assignee: Northwest A&F University, Xianyang (CN)

( * ) Notice: Subject to any disclaimer, the term of this patent is extended or adjusted under 35 U.S.C. 154(b) by 366 days.

(21) Appl. No.: 16/729,428

(22) Filed: Dec. 29, 2019

(65) Prior Publication Data

US 2020/0362948 A1    Nov. 19, 2020

(30) Foreign Application Priority Data

May 13, 2019   (CN) .......................... 201910392199.X

(51) Int. Cl.
*F16H 25/22* (2006.01)
*F16C 19/06* (2006.01)
*F16C 33/38* (2006.01)

(52) U.S. Cl.
CPC .......... *F16H 25/2233* (2013.01); *F16C 19/06* (2013.01); *F16C 33/3862* (2013.01)

(58) Field of Classification Search
CPC .. F16H 25/2233; F16C 19/06; F16C 33/3862; F16C 31/04; F16C 33/58; F16C 33/585
See application file for complete search history.

(56) References Cited

FOREIGN PATENT DOCUMENTS

| GN | 109458400 A | 3/2019 | |
|---|---|---|---|
| NL | WO-8300366 A1 * | 2/1983 | ........... B62D 5/0448 |

\* cited by examiner

*Primary Examiner* — Zakaria Elahmadi

(57) ABSTRACT

The invention relates to mechanical engineering, and more particularly to a curved groove ball bearing mechanism, in which a pair of curved groove ball bearings without a retainer are symmetrically arranged to enable the conversion between the rotary motion and the reciprocating linear motion. The bearing mechanism includes an inner ring, a first outer ring, a second outer ring, a plurality of first steel balls and a plurality of second steel balls. The invention is capable of achieving the conversion between the rotary motion of the inner ring into the reciprocating linear motion of the first and second outer rings.

3 Claims, 5 Drawing Sheets

US 11,421,764 B2

CURVED GROOVE BALL BEARING MECHANISM

CROSS-REFERENCE TO RELATED APPLICATIONS

This application claims the benefit of priority from Chinese Patent Application No. 201910392199.X, filed on May 13, 2019. The content of the aforementioned application, including any intervening amendments thereto, is incorporated herein by reference in its entirety.

TECHNICAL FIELD

This application relates to mechanical engineering, particularly to a curved groove ball bearing mechanism, and more particularly to a curved groove ball bearing mechanism capable of enabling the conversion between a rotary motion and a reciprocating linear motion.

BACKGROUND OF THE INVENTION

Conversion between a rotary motion and a reciprocating linear motion is widely applied in industrial processing and mechanical equipments, where the commonly-used converting mechanisms includes crank-link mechanisms, cam mechanisms, crank-slider mechanisms and crank-wobbler mechanisms. Among them, a converting mechanism consisting of a piston and a crank link is the most widely used mechanism.

In a crank-piston mechanism of an automobile engine, the crank, as one of the most important parts of the crank-link mechanism, primarily plays a role in converting a reciprocating linear motion of the piston into a rotary motion. However, due to the complex structure and large size, the crank fails to completely achieve a dynamic and static balance. Moreover, the crank also involves high requirements for the material and great difficulty in processing. Another important part of the crank link mechanism is a connecting rod, which includes a rod body, a small end bushing, a big end bearing bush and a connecting rod bolt. The connecting rod is configured to connect the crank with the piston, where the small end reciprocates with the piston, and the big end rotates with the crank. The crank-link mechanism is cumbersome, and generates large vibration, complex inertial effects and noise during operation. The connecting rod also has complicated force and movement state. The cam mechanism is capable of realizing various complex motions and accurately realizing the required motion, and it also has a simple and compact structure. However, the cam mechanism adopts point or line contact, which causes a large pressure, rendering the mechanism easy to wear. Therefore, it cannot be used for a high-speed and large-range movement, and also fails to convert a reciprocating linear motion into a rotary motion. To overcome the shortcomings of traditional mechanisms for performing the conversion between a reciprocating linear motion and a rotary motion, such as crank-link mechanism and cam mechanism, this invention discloses a curved groove ball bearing mechanism, which employs a pair of symmetrically arranged curved groove ball bearings without a retainer (referred to Chinese Patent Application No. 201910024162.1), and uses a slider to limit the rotary motion of an outer ring, such that the outer ring can only reciprocate, achieving a conversion between the rotary motion of an inner ring and the reciprocating linear motion of the outer ring.

SUMMARY OF THE INVENTION

The invention provides a curved groove ball bearing mechanism, which is capable of enabling the conversion between the rotary motion and the reciprocating linear motion. The mechanism comprises an inner ring, a first outer ring, a second outer ring, a plurality of first steel balls and a plurality of second steel balls. The rotary motion of the curved groove ball bearing mechanism disclosed herein is completely performed by symmetrically rotary parts, overcoming many defects in the crank-link mechanism and the cam mechanism.

Technical solutions of the invention are described as follows.

Provided herein is a curved groove ball bearing mechanism, comprising:
an inner ring,
a first outer ring,
a plurality of first steel balls,
a connector,
a second outer ring,
a plurality of second steel balls,
a rotation drive, and
a slider;
wherein:
the inner ring is provided with a first curved groove and a second curved groove; the plurality of first steel balls are arranged on the first curved groove, and the plurality of second steel balls are arranged on the second curved groove;
outer diameters of each of ends of the inner ring are the same, and an outer diameter of each of ends of the inner ring is equal to or smaller than a distance between centers of two first steel balls or second steel balls which are arranged symmetrically with respect to an axis of the inner ring;
an outer diameter of a middle of the inner ring is equal to or smaller than a distance between outermost tangent points of two first steel balls or second steel balls which are arranged symmetrically with respect to the axis of the inner ring;
the first outer ring is provided with a third curved groove; the second outer ring is provided with a forth curved groove;
the first curved groove, the second curved groove, the third curved groove and the forth curved groove are the same in period, phase and amplitude so that a distance between a center line formed by centers of the first and second steel balls is constant;
wherein the first outer ring is divided into a first portion and a second portion by the third curved groove, and the second outer ring is divided into a third portion and a forth portion by the forth curved groove;
inner diameters of the first portion of the first outer ring and the third portion of the second outer ring are the same, and inner diameters of the second portion of the first outer ring and the forth portion of the second outer ring are the same;
an inner diameter of each of the first portion of the first outer ring and the third portion of the second outer ring is equal to or larger than the outer diameter of each of ends of the inner ring; and an inner diameter of each of the second portion of the first outer ring and the forth portion of the second outer ring is equal to or larger than the outer diameter of a middle of the inner ring;

the first outer ring and the second outer ring are fixedly connected through the connector to form a integral structure.

In an embodiment, the first steel balls are the same as the second steel balls in number; and the length of the center line of each of the first, second, third and forth curved grooves is a positive integral multiple of the number of the first steel balls or the second steel balls.

In an embodiment, the first outer ring and the second outer ring are integrally connected with phases thereof staggered by half a period, i.e., in a manner of peak-to-peak and valley-to-valley.

The invention also provides another curved groove ball bearing mechanism, comprising:
  an inner ring, an outer ring and a plurality of steel balls; wherein:
    the inner ring is provided with a first curved groove, and the outer ring is provided with a second curved groove;
    the steel balls are provided on the first curved groove; and
    a length of a center line of the first curved groove is a positive integral multiple of the diameter of each of the steel balls.

Compared to the traditional crank-link mechanism and cam mechanism, the curved groove ball bearing mechanism provided herein has the following beneficial effects.

1. The mechanism has a simple structure and a small size.
  2. The moving parts only have a rotary motion and a reciprocating linear motion, creating small noise.
  3. The mechanism requires fewer parts, and has low requirements for processing, such that it is easy to manufacture.

DETAILED DESCRIPTION OF EMBODIMENTS

The invention will be described further with reference to the drawings.

Example 1

Figure 1:
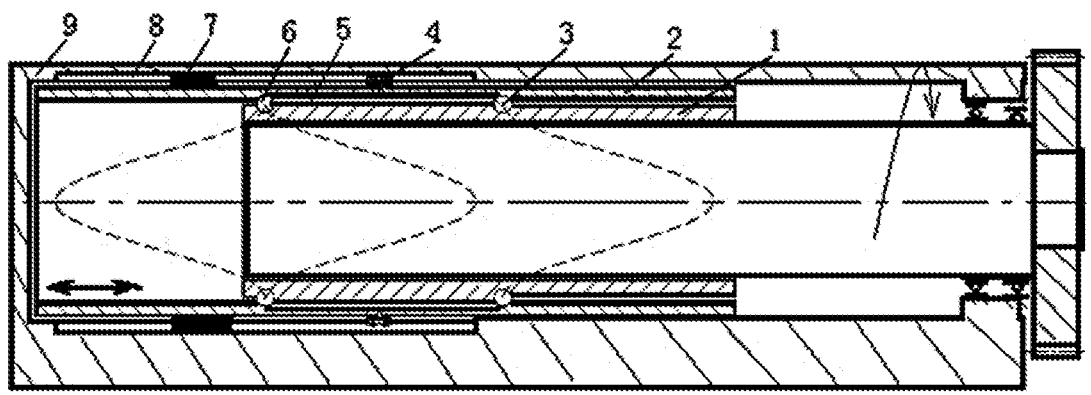
FIG. 1 schematically shows a curved groove ball bearing mechanism according to Example 1 of the invention when an outer ring moves to the left.
Figure 2:
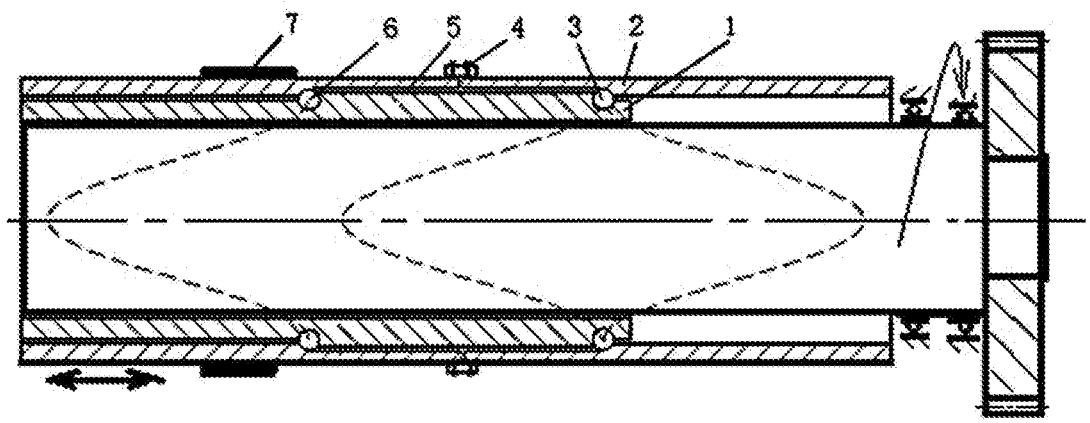
FIG. 2 schematically shows the curved groove ball bearing mechanism (a rack is not shown) according to Example 1 of the invention when the outer ring moves to the right.

Referring to the drawings, FIG. 1 schematically shows a curved groove ball bearing mechanism of the invention when an outer ring moves to the left, and FIG. 2 schematically shows the curved groove ball bearing mechanism when the outer ring moves to the right, where a first outer ring 5 and a second outer ring 2 are integrally connected via a connector 4.

Figure 3:
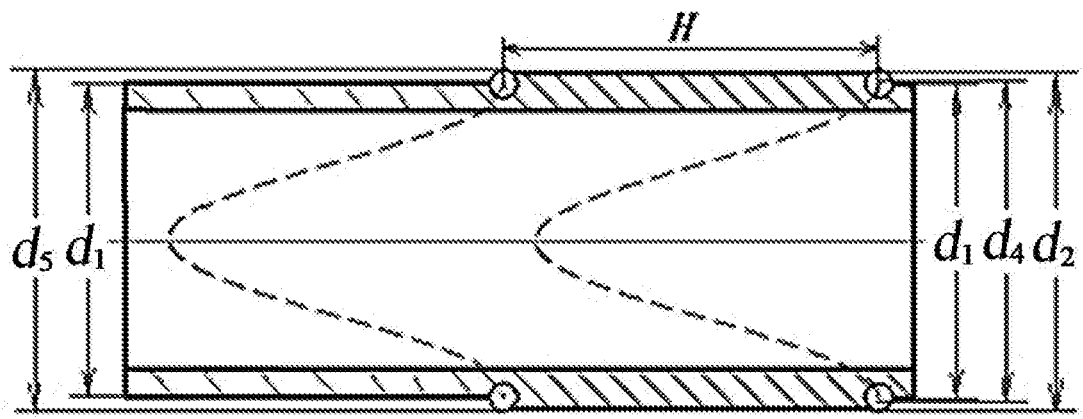
FIG. 3 schematically shows an inner ring according to Example 1 of the invention.

FIG. 3 schematically shows an inner ring 1 of the curved groove ball bearing mechanism, where the inner ring is provided with a first curved groove and a second curved groove; the plurality of first steel balls are arranged on the first curved groove, and the plurality of second steel balls are arranged on the second curved groove.

Outer diameters $d_1$ of each of ends of the inner ring are the same, and a nominal diameter of an outer diameter $d_1$ (negative tolerance) of each of ends of the inner ring 1 is equal to or smaller than a distance $d_4$ between centers of two first steel balls 6 or second steel balls 3 which are arranged symmetrically with respect to an axis of the inner ring 1.

A nominal diameter of an outer diameter $d_2$ (negative tolerance) of a middle of the inner ring 1 is equal to or smaller than a distance $d_5$ between outermost tangent points of two first steel balls or second steel balls which are arranged symmetrically with respect to the axis of the inner ring.

Figure 4:
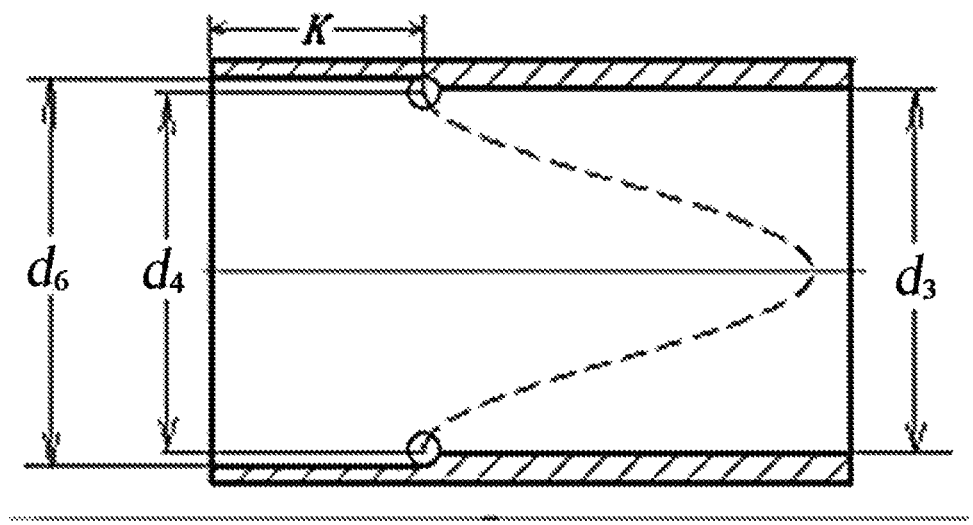
FIG. 4 is a schematic diagram showing a first outer ring and the arrangement of steel balls according to Embodiment 1 of the invention.
Figure 5:
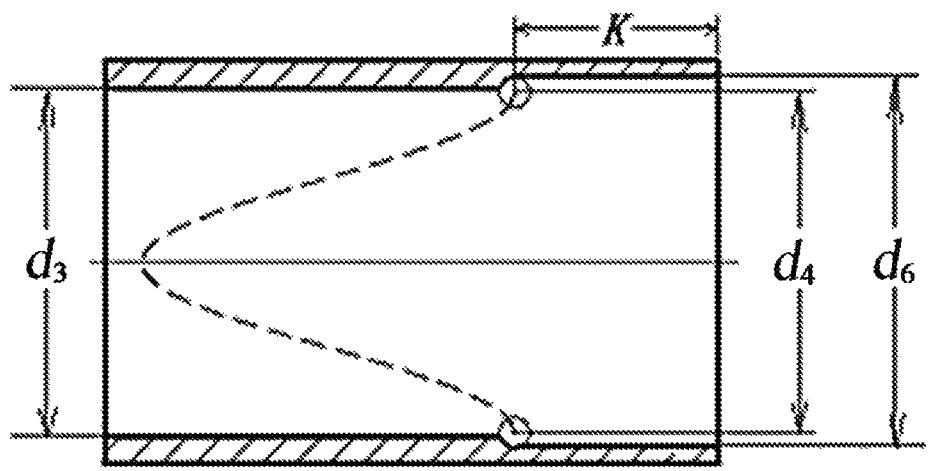
FIG. 5 is a schematic diagram showing a second outer ring and the arrangement of the steel balls according to Example 1 of the invention.
Figure 6:
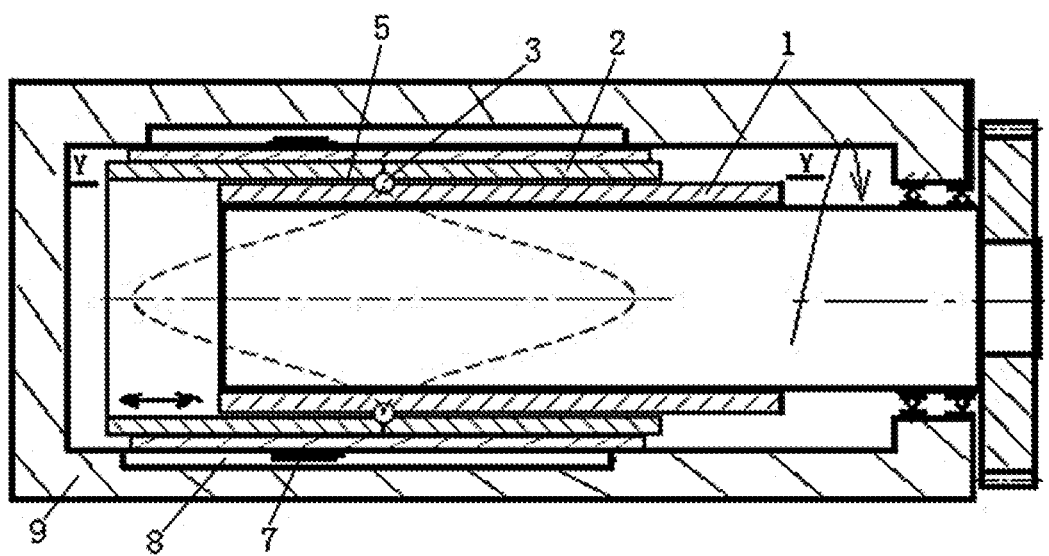
FIG. 6 schematically shows a curved groove ball bearing mechanism with a single row of steel balls according to Example 2 of the invention when an outer ring moves to the left.
Figure 7A:
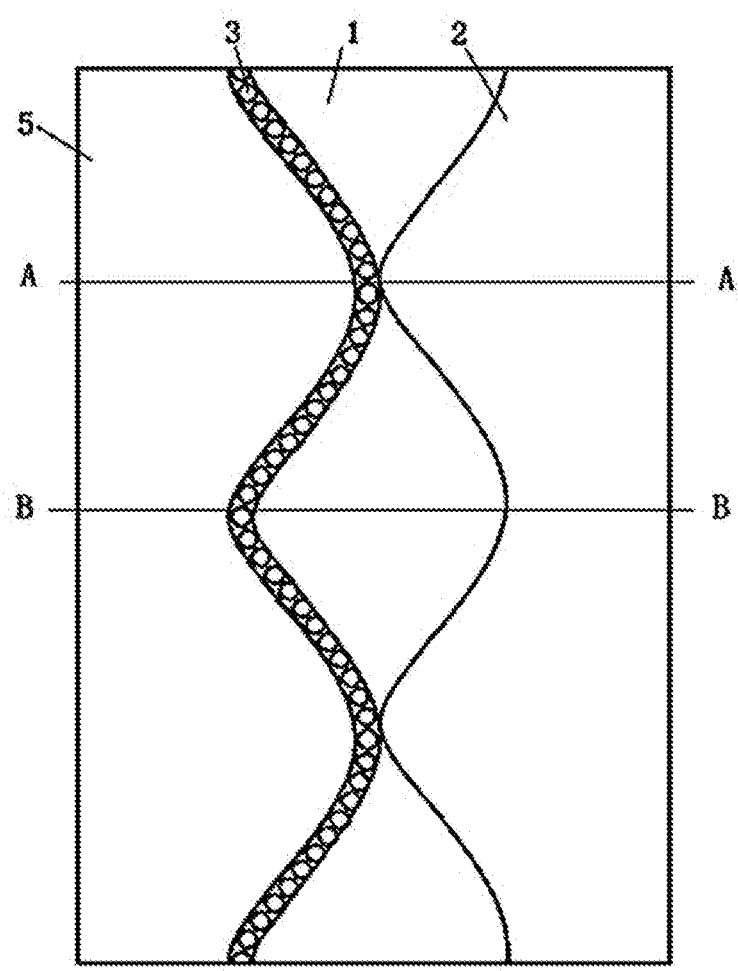
FIG. 7A is a schematic view, expanded along a Y-Y line of FIG. 6, of the curved groove ball bearing mechanism with a single row of steel balls according to Example 2 of the invention when the outer ring moves to the left.
Figure 7B:
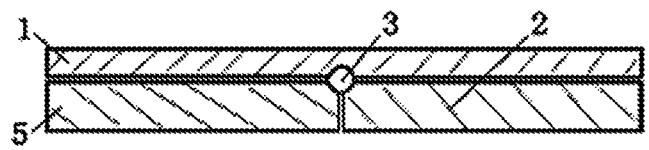
FIG. 7B is a sectional view taken along an A-A line of FIG. 7A.
Figure 7C:
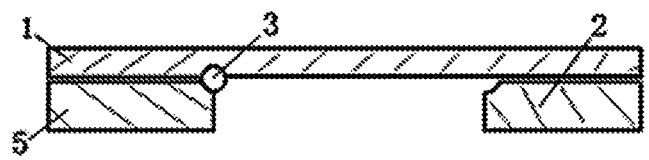
FIG. 7C is a sectional view taken along a B-B line of FIG. 7B.
Figure 8:
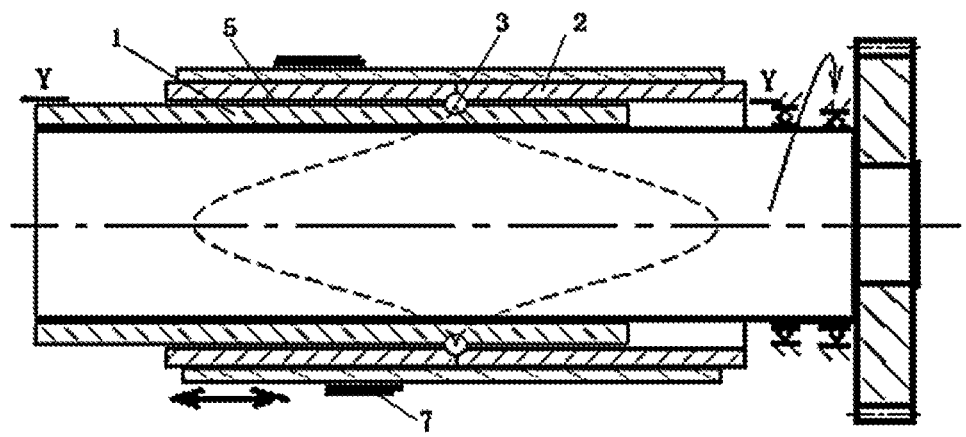
FIG. 8 is a schematic view of the curved groove ball bearing mechanism with a single row of steel balls (the rack is not shown) according to Example 2 of the invention when the outer ring moves to the right.
Figure 9:
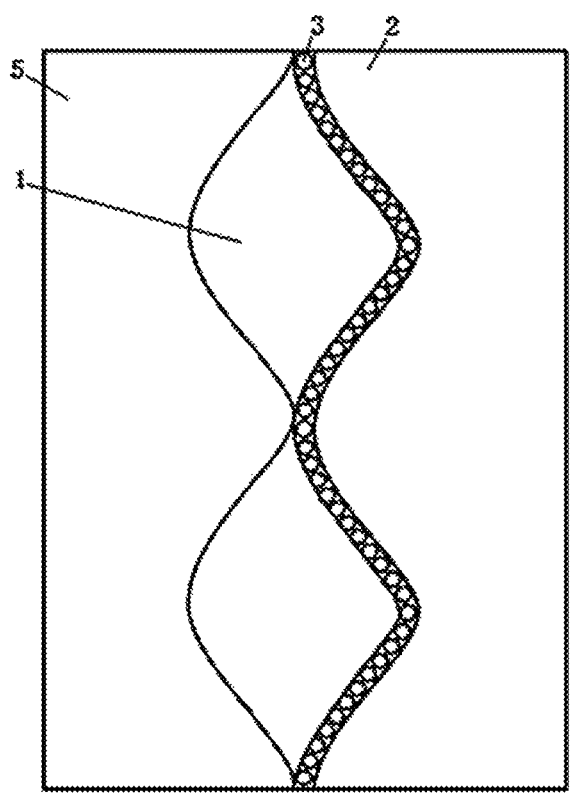
FIG. 9 is a schematic view, expanded along a Y-Y line of FIG. 6, of the curved groove ball bearing mechanism with a single row of steel balls according to Example 2 of the invention when the outer ring moves to the right.

FIGS. 4 and 5 respectively show a first outer ring and a second outer ring and the arrangement of steel balls. The first outer ring 5 is provided with a third curved groove, and the second outer ring 2 is provided with a forth curved groove. The first curved groove, the second curved groove, the third curved groove and the forth curved groove are the same in period, phase and amplitude so that a distance between a center line formed by centers of the first and second steel balls is constant. The first outer ring 5 is divided into a first portion and a second portion by the third curved groove, and the second outer ring 2 is divided into a third portion and a forth portion by the forth curved groove.

Inner diameters of the first portion of the first outer ring and the third portion of the second outer ring are the same, and inner diameters of the second portion of the first outer ring and the forth portion of the second outer ring are the same. A nominal diameter of an inner diameter $d_3$ (positive tolerance) of each of the first portion of the first outer ring 5 and the third portion of the second outer ring 2 is equal to or larger than the nominal diameter of the outer diameter $d_1$ of each of ends of the inner ring 1; and a nominal diameter of an inner diameter $d_6$ (positive tolerance) of each of the second portion of the first outer ring 5 and the forth portion of the second outer ring 2 is equal to or larger than the nominal diameter of the outer diameter $d_2$ of a middle of the inner ring.

The first steel balls 6 have a same number of 38 with that of the second steel balls 3; and the length of the center line of each of the first, second, third and forth curved grooves is 38 times of the diameter of each of the first steel balls 6 or the second steel balls 3.

Example 2

As shown in FIGS. 6, 7A-C and 8-9, the invention provides another curved groove ball bearing mechanism with a single row of steel balls, where the middle of the inner ring 1 having an outer diameter $d_2$ has a length H of 0.

Based on the content disclosed herein, various changes and modification with respect to diameter, period and amplitude can be made to obtain other embodiments, which should fall within the scope of the invention

What is claimed is:

1. A curved groove ball bearing mechanism, comprising:
an inner ring,
a first outer ring,
a plurality of first steel balls,
a connector,
a second outer ring,
a plurality of second steel balls,
a rotation drive, and
a slider;
wherein:
the inner ring is provided with a first curved groove and a second curved groove; the plurality of first steel balls are arranged on the first curved groove, and the plurality of second steel balls are arranged on the second curved groove;
outer diameters of each of ends of the inner ring are the same, and an outer diameter of each of ends of the inner ring is equal to or smaller than a distance between centers of two first steel balls or second steel balls which are arranged symmetrically with respect to an axis of the inner ring;
an outer diameter of a middle of the inner ring is equal to or smaller than a distance between outermost tangent points of two first steel balls or second steel balls which are arranged symmetrically with respect to the axis of the inner ring;
the first outer ring is provided with a third curved groove; the second outer ring is provided with a forth curved groove;
the first curved groove, the second curved groove, the third curved groove and the forth curved groove are the same in period, phase and amplitude so that a distance between a center line formed by centers of the first and second steel balls is constant;
wherein the first outer ring is divided into a first portion and a second portion by the third curved groove, and the second outer ring is divided into a third portion and a forth portion by the forth curved groove;
inner diameters of the first portion of the first outer ring and the third portion of the second outer ring are the same, and inner diameters of the second portion of the first outer ring and the forth portion of the second outer ring are the same;
an inner diameter of each of the first portion of the first outer ring and the third portion of the second outer ring is equal to or larger than the outer diameter of each of ends of the inner ring; and an inner diameter of each of the second portion of the first outer ring and the forth portion of the second outer ring is equal to or larger than the outer diameter of a middle of the inner ring; and
the first outer ring and the second outer ring are fixedly connected through the connector to form a integral structure.

2. The curved groove ball bearing mechanism of claim 1, wherein
the first steel balls are the same as the second steel balls in number; and the length of the center line of each of the first, second, third and forth curved grooves is a positive integral multiple of the diameter of each of the first steel balls.

3. The curved groove ball bearing mechanism of claim 1, wherein
the first outer ring and the second outer ring are integrally connected with phases thereof staggered by half a period.

* * * * *